Patented Jan. 11, 1944

2,338,893

UNITED STATES PATENT OFFICE 2,338,893

HIGHER MOLECULAR SUBSTANCE FROM ALLYL CHLORIDE AND ITS HOMOLOGUES

Walter Bauer, Darmstadt, and Franz Götz, Darmstadt-Eberstadt, Germany; vested in the Alien Property Custodian No Drawing. Application April 10, 1939, Serial No. 267,160. In Germany April 27, 1938

3 Claims. (Cl. 260—85)

The invention relates to the production of higher molecular substances from allyl chloride and its homologues.

It has been found that allyl chloride and its homologues may be converted into technically valuable, higher molecular substances by the action of peroxide catalysts such as benzoyl peroxide, acetyl peroxide, ethylene peroxide, and tetralin peroxide. The conversion is preferably carried out at somewhat elevated temperature. In order to secure a satisfactory conversion, when ordinary pressure is used (that is, at temperatures up to the boiling point of the raw material), a reaction period of at least several days is necessary. The reaction period may also be shortened by operating under increased pressure and elevated temperature.

The higher molecular compounds obtained vary according to the nature of the raw materials employed. In general, a plurality of higher molecular compounds are obtained simultaneously from a single raw material. A portion of the raw material remains unaltered in every case. It may be recovered by distillation and again subjected to the converting process.

The allyl chloride and its homologues may also be subjected to the treatment of the invention while mixed together with each other. The mixing may be effected either prior to or during the conversion. In these cases, higher molecular compounds will also be formed to a certain extent, which contain a number of the raw materials as their constituents. In addition to or in lieu of such compounds, it is also possible to add other substances, e. g., solvents, dispersing agents, softeners, fillers, resins, rubber, cellulose, and compounds of such substances, either prior to, during, or after the conversion.

The 2-methyl allyl chloride may with special advantage be subjected either alone or mixed with other substances to the action of the peroxide catalysts.

The products produced in accordance with the present invention are apparently mixtures of lower and higher polymers. For example, when 2-methyl allyl chloride is converted, the dimeric products predominate: allyl chloride predominatingly yields a higher molecular product.

Example 1

100 parts by weight of allyl chloride are boiled in reflux fashion with 1% benzoyl peroxide for 4 weeks. Fractionation of the reaction product yields the following:

|  | Parts by weight |  |
|---|---|---|
| at 46–54° | 56 | (unaltered allyl chloride) |
| 54–63° | 8 | |
| 112–150°/14 mm | 1.4 | |
| 150–254°/14 mm | 3.6 | |
| Distillation residue | 30.4 | |

The fractions which boil above 100° C. at 14 mm. pressure consist of the dimeric, trimeric and higher polymers of allyl chloride.

The residue is a viscous, sticky, non-combustible mass which is applicable as a softening agent, adhesive, lubricant, for preparing lacquers, and for impregnating purposes.

Example 2

1500 g. of 2-methyl allyl chloride

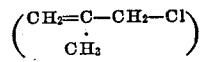

are boiled in reflux fashion with 1% benzoyl peroxide for 8 days. Fractionation of the reaction product yields:

| | | | |
|---|---|---|---|
| at 68–78° | 940 g. | =62.7% | unaltered 2-methyl allyl chloride |
| 80–92° | 476 g. | =32.4% | dimeric 2-methyl allyl chloride |
| 135–140°/12 mm | 5.1 g. | =.34% | |
| 140–180°/12 mm | 15 g. | =1% | |
| 180–200°/12 mm | 14.5 g. | =.97% | |
| 200–240°/12 mm | 21.8 g. | =1.45% | |
| Distillation residue | 12.4 g. | =.83% | |

The principal product of the reaction, the dimeric 2-methyl allyl chloride, after purification, exhibits a boiling point of 84.5 to 85° at 13 mm., a specific gravity of .9328 at 20°, and a refractive index $n^{20}_D = 1.477$. Under normal pressure the product boils at 194–196° and decomposes. The molecular weight was found to be 177 (the theoretical is 181).

The dimeric 2-methyl allyl chloride is colorless and water-clear and has an agreeable, terpene-like odor. It is difficultly inflammable and exhibits no tendency to split off hydrochloric acid spontaneously. It is insoluble in water but miscible with most organic solvents. It may be used as a detergent, insecticide, and also as a solvent and diluent, since it has a good solvent capacity e. g., for most artificial and natural resins.

The fractions which boil above 100° C. at 12 mm. pressure consist of the trimeric, tetrameric and higher polymers of the methyl allyl chloride.

We claim:

1. A method of producing higher molecular substances from monomeric allyl chloride or its homologues which consists in heating under reflux a member of a group consisting of allyl chloride and its homologues for a period of at least several days in the presence of a polymerization catalyst.

2. A method as set forth in claim 1 wherein allyl chloride is boiled for a period of about four weeks.

3. A method as set forth in claim 1 wherein 2-methyl allyl chloride is boiled for a period of about eight days.

WALTER BAUER.
FRANZ GÖTZ.